(12) United States Patent
Basso et al.

(10) Patent No.: US 6,317,131 B2
(45) Date of Patent: *Nov. 13, 2001

(54) INTERACTION MODALITIES FOR MULTIMEDIA DELIVERY AND PRESENTATION USING NODES

(75) Inventors: Andrea Basso, N. Long Branch; Erich Haratsch, Holmdel; Barin Geoffry Haskell, Tinton Falls; Joern Ostermann, Red Bank, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/113,748

(22) Filed: Jul. 10, 1998

Related U.S. Application Data

(60) Provisional application No. 60/052,576, filed on Jul. 15, 1997.

(51) Int. Cl.⁷ ................................................... G06T 15/70

(52) U.S. Cl. ......................... 345/474; 345/473; 345/475; 709/203

(58) Field of Search ................................. 345/473, 474, 345/475, 512, 327; 348/441; 709/203

(56) References Cited

U.S. PATENT DOCUMENTS

| | | | | |
|---|---|---|---|---|
| 5,936,643 | * | 8/1999 | Tindell et al. | 345/512 |
| 6,034,732 | * | 3/2000 | Hirota et al. | 348/441 |
| 6,049,332 | * | 4/2000 | Boetje et al. | 345/327 |
| 6,058,397 | * | 5/2000 | Barrus et al. | 345/473 |

OTHER PUBLICATIONS

J. Ostermann et al., "Ensuring Quality of Service for Scene Graphs with BIFS," International Organization For Standardization, Coding of Moving Pictures and Associated Audio Information, ISO/IEC JTC1/SC29/WG11, MPEG 97/2315, Jul. 1997, pp. 1–3.

A. Basso et al., "Requirements for a back channel: Messages from the Decoder to the Encoder," International Organization For Standardization, Coding of Moving Pictures and Audio, ISO/IEC JTC1/SC29/WG11, MPEG97/M2882, Oct. 1997, pp. 1–3.

Y. Tomita et al, "Requirements for Backward Channel," International Organisation For Standardisation, Coding of Moving Pictures and Associated Audio Information, ISO/IEC JTC1/SC29/WG11, MPEG97, Oct. 1997, pp. 1–3.

Loeb, "Delivering Interactive Multimedia Documents over Networks", IEEE Communication Magazine, May 1992, pp. 52–59.*

* cited by examiner

Primary Examiner—Cliff N. Vo
Assistant Examiner—Kimbinh T. Nguyen
(74) Attorney, Agent, or Firm—Kenyon & Kenyon

(57) ABSTRACT

A system and method for reproducing a multimedia data signal on a terminal. A terminal capability node is instantiated and the terminal capability is evaluated. The value of a capability is set, and the value is then altered based upon the capability of the evaluated terminal.

68 Claims, 6 Drawing Sheets

INTERACTION MODALITIES FOR MULTIMEDIA DELIVERY AND PRESENTATION USING NODES

This application claims priority to Provisional Application No. 60/052,576, filed Jul. 15, 1997.

FIELD OF THE INVENTION

The present invention relates to displaying multimedia data. More particularly, the present invention relates to systems and methods for improving the quality of a multimedia display based on preferences and terminal capabilities.

BACKGROUND OF THE INVENTION

Currently, complex two-dimensional and three-dimensional scenes are described by scene graphs and small software programs that are downloaded to a terminal. A scene graph is a graphical representation of the contents of a scene. The scene graph determines, among other things, how three-dimensional objects are configured, where the video goes, where the audio goes, and how data is to be presented.

Programs are usually interpreted and executed at a terminal, but they require support for the program interpreter and program execution. This makes undesirable programs that are currently required to support meaningful scene descriptions.

Partial solutions exist for describing three-dimensional graphics content using scene graphs as described using Virtual Reality Modeling Language ("VRML"). The recent standards promulgated by the Motion Picture Experts Group, MPEG-4, extend this scene graph approach to describe natural and synthetic audio, video, and graphics scenes. These scene graphs do not provide any means by which the scene description could be automatically adapted to the terminal capabilities. This is because the known scene graph has no means of inquiring as to the terminal capabilities.

As an example, when rendering moving three-dimensional objects, the use of texture maps should be limited to terminals that support hardware-texture mapping. If a terminal does not support hardware-texture mapping, the render speed can easily drop below 2 frames per second, thus resulting in a lower-quality presentation than would otherwise be rendered.

If a content provider designs multimedia content for high-end terminals, it will be extremely difficult for a low-end terminal to present the content in an acceptable manner. Alternatively, if the content is designed for low-end terminals, using a high-end terminal will result in a poor-quality presentation.

To overcome these problems, VRML scene descriptions provide script capability. Scripts are small programs, executed at the terminal, that allow for both scene-graph animation and complicated interactions with the terminal. Scripts allow one to inquire as to a terminal's capabilities. Because scripts also enable arbitrary complex operations, however, the content provider is not able to design contents and scene graphs with a guaranteed level of performance in the terminal.

To avoid the overhead and unpredictable performance of the content presentation on a given terminal, the standards implemented in MPEG-4 do not implement scripts in its scene description language. Rather, what is required is a mechanism to enable scene-graph adaptation to the terminal without using scripts.

One such mechanism makes use of a backchannel. The backchannel enables interactivity with a server and allows the content presentation or scene graph to adapt to the terminal's capabilities. The use of a backchannel, however, requires additional protocols and infrastructure. For broadcast applications, however, the server is not able to adapt to the capabilities of each terminal but only to overall capabilities and events on the broadcast channel. Again, a mechanism is required that allows the content to adapt automatically to the terminal capabilities.

SUMMARY OF THE INVENTION

The prior art lacks a meaningful way of allowing a user who receives multimedia data to improve the quality of what is displayed based on both receiver preferences and terminal capabilities.

In one embodiment of the present invention, a terminal capability node is instantiated, the terminal's capability is evaluated, and then the value of a capability field in a data stream is altered based upon the capability evaluation. This could be employed, for example, with streaming multimedia data being received at a computer. It would be beneficial for the receiving computer to have some way of analyzing how the received data is to be displayed with regard to system resources, and then adjusting various display parameters to alter the display based on user preferences and/or based on choices of the multimedia content creator.

A terminal capability node is part of a multimedia scene description. A content provider includes this node in the scene to switch the contents presentation based on the terminal capabilities, and the terminal capabilities are evaluated by the terminal on which the contents are presented.

DETAILED DESCRIPTION

The present invention relates to displaying multimedia data. More particularly, the present invention relates to systems and methods for improving the quality of a multimedia display based on user preferences and availability of terminal resources.

Figure 1:
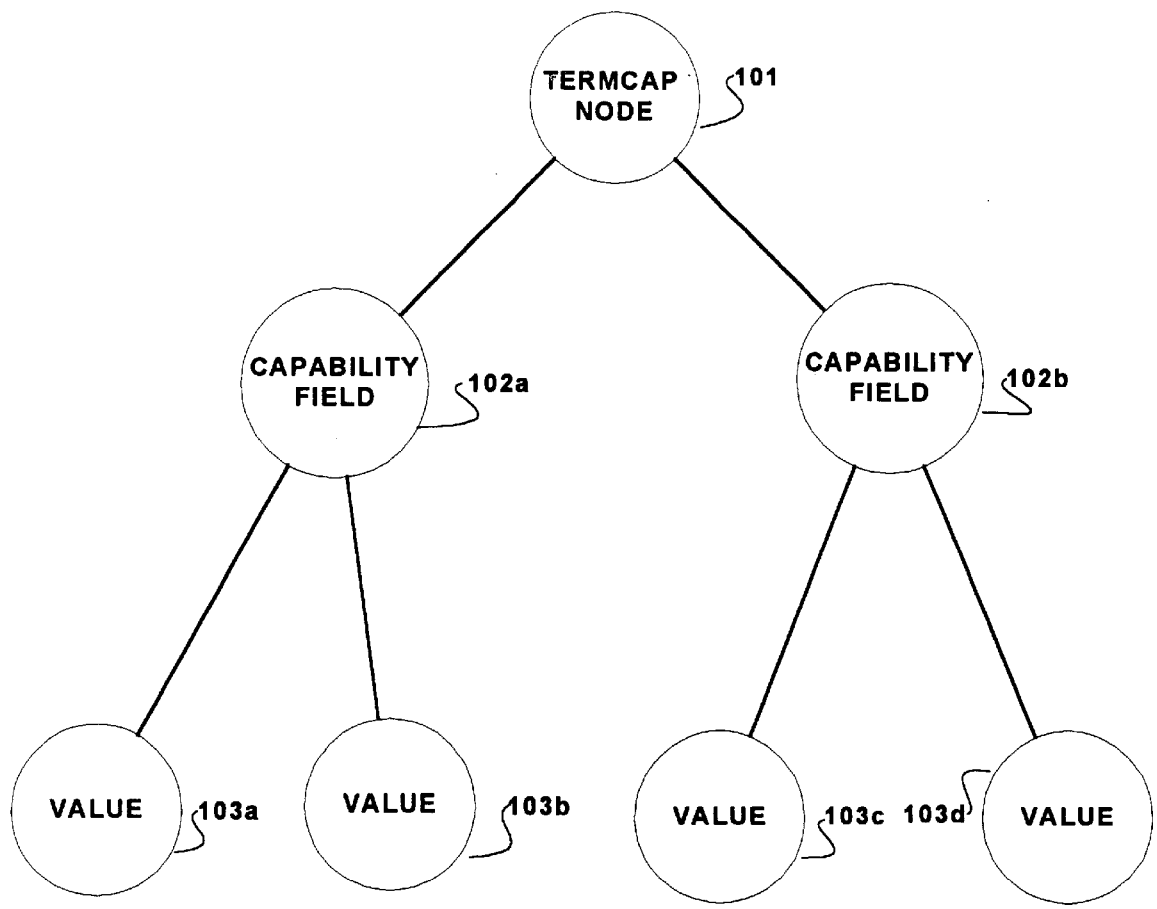
FIG. 1 is a system overview of an embodiment of the present invention.

Referring now in detail to the drawings, FIG. 1 illustrates a system overview of an embodiment of the present invention. As a context for the present invention, consider terminal capability ("termcap") node 101. A node is a software object that contains data as well as instructions that work upon that data. These objects, or nodes, are the encapsulation of the attributes, relationships, and methods of software-identifiable program components. In the node, most of the details, including both the data structure and the procedures, are hidden. Associated with the object is a set of operations it can perform, and these are not hidden; they constitute a well-defined interface—that aspect of the object that is externally visible. The nodes are layered in hierarchical fashion, so that termcap node 101 contains capability-field nodes 102a and 102b. These capability-field nodes in turn contain values 103a–103d that determine the values of the capability fields.

Termcap node 101 contains and controls, through software, various system parameters or capability fields for displaying multimedia data. A capability field describes the terminal's hardware or software capabilities. Examples of individual capability fields include frame rate, color depth, screen size, graphics load, and CPU load.

To each of these individual capability fields, a value is assigned by the terminal. The value of the fields are set by the software program that implements the node. The value of the fields can be variable, or it can be fixed when dependent on hardware. Variable values can be updated either periodically, or asynchronously when an event triggers the update.

The following table, TABLE 1, displays examples of possible capability fields. The capability field specifies a terminal resource to query.

TABLE 1

| capability | meaning |
| --- | --- |
| 0 | frame rate |
| 1 | color depth |
| 2 | screen size |
| 3 | graphics hardware |
| 64 | CPU load |
| 65 | memory load |
| 128 | visual objects profile |
| 129 | visual combination profile and level |
| 130 | audio object profile and level |
| 131 | audio combination profile and level |
| 132 | scene description profile and level |

The following table, TABLE 2, displays examples of possible values for the capability field "frame rate." For this value of capability, the current rendering frame rate is measured. Periodically, the value is updated according to the current graphics rendering frame rate, as follows:

TABLE 2

| value | meaning |
| --- | --- |
| 0 | unknown or can't determine |
| 1 | less than 5 frames per second ("fps") |
| 2 | 5–10 fps |
| 3 | 10–20 fps |
| 4 | 20–40 fps |
| 5 | more than 40 fps |

For the breakpoint between overlapping values between each range (i.e., 5, 10, 20, and 40), the higher value shall be used (i.e., 2, 3, 4, and 5, respectively).

The following table, TABLE 3, displays examples of possible values for the capability field "color depth." For this value of capability, the color depth of the rendering terminal is measured. At the time this node is instantiated, the value filed is set to indicate the color depth. The value does not change afterwards; that is, the display resolution does not change. The value is set as follows:

TABLE 3

| value | meaning |
| --- | --- |
| 0 | unknown or can't determine |
| 1 | 1 bit/pixel |
| 2 | grayscale |
| 3 | color, 3–12 bit/pixel |
| 4 | color, 12–24 bit/pixel |
| 5 | color, more than 24 bit/pixel |

The following table, TABLE 4, displays examples of possible values for the capability field "screen size." For this value of capability, the window size (in horizontal lines) of the output window of the rendering terminal is measured. Periodically, the value is set to indicate the size of the current rendering window, as follows:

TABLE 4

| value | meaning |
| --- | --- |
| 0 | unknown or can't determine |
| 1 | less than 200 lines |
| 2 | 200–400 lines |
| 3 | 400–800 lines |
| 4 | 800–1600 lines |
| 5 | 1600 or more lines |

The following table, TABLE 5, displays examples of possible values for the capability field "graphics hardware." For this value of capability, the availability of graphics-acceleration hardware of the rendering terminal is measured. At the time this node is instantiated, the value is set to indicate the available graphics hardware. The value does not change afterwards. The value is set as follows:

TABLE 5

| value | meaning |
| --- | --- |
| 0 | unknown or can't determine |
| 1 | no acceleration |
| 2 | matrix multiplication |
| 3 | all above plus texture mapping (less than 1M memory) |
| 4 | all above + texture mapping (less than 4M memory) |
| 5 | all above + texture mapping (more than 4M memory) |

The following table, TABLE 6, displays examples of possible values for the capability field "CPU load." For this value of capability, the CPU load of the rendering terminal is measured. The exact method of measurement is nonnormative. Periodically, or when triggered by some event, the value is set to indicate the current CPU load. The value is set as a percentage of the available CPU resource; that is, if all the CPU cycles are consumed, and no more calculation can be performed without slipping out of real-time, the indicated value shall be 100%; if twice as much calculation as currently being done can be so performed, the indicated value shall be 50%.

TABLE 6

| value | meaning |
| --- | --- |
| 0 | unknown or can't determine |
| 1 | less than 20% loaded |
| 2 | 20–40% loaded |
| 3 | 40–60% loaded |

TABLE 6-continued

| value | meaning |
|---|---|
| 4 | 60–80% loaded |
| 5 | 80–100% loaded |

The following table, TABLE 7, displays examples of possible values for the capability field "memory load," also called "RAM available." For this value of capability, the available RAM of the rendering terminal is measured. The exact method of measurement is nonnormative. Periodically, the value is set to indicate the currently available amount of RAM.

TABLE 7

| value | meaning |
|---|---|
| 0 | unknown or can't determine |
| 1 | less than 100 KB free |
| 2 | 100 KB-500 KB free |
| 3 | 500 KB-2 MB free |
| 4 | 2 MB-8 MB free |
| 5 | 8 MB-32 MB free |
| 6 | 32 MB-200 MB free |
| 7 | more than 200 MB free |

The following table, TABLE 8, displays examples of possible values for the capability field "visual objects profile." According to the MPEG-4 standard, each object profile defines a collection of tools that are required to decode an audiovisual object. The following table, TABLE 8, lists video object profiles.

TABLE 8

| value | meaning |
|---|---|
| 0 | simple |
| 1 | core |
| 2 | main |
| 3 | simple scale |
| 4 | 12 bit |
| 5 | basic animation 2D texture |
| 6 | animation 2D mesh |
| 7 | simple face |
| 8 | simple scalable texture |
| 9 | core scalable texture |

The following table, TABLE 9, displays examples of possible values for the capability field "visual combination profile and level." Combination profiles are collections of object profiles. According to MPEG-4, the levels define parameter limits that the multimedia data will not exceed.

TABLE 9

| value | meaning |
|---|---|
| 0 | simple B-VOP scalable |
| 1 | core |
| 2 | main |
| 3 | 12 bit |
| 4 | simple scalable texture |
| 5 | simple FA |
| 6 | hybrid |
| 7 | basic animated 2D texture |

The following table, TABLE 10, displays examples of possible values for the capability field "audio object profile and level."

TABLE 10

| value | meaning |
|---|---|
| 0 | AAC Main |
| 1 | AAC LC |
| 2 | AAC SSR |
| 3 | T/F |
| 4 | T/F Main scalable |
| 5 | T/F LC scalable |
| 6 | Twin VQ core |
| 7 | CELP |
| 8 | HVXC |
| 9 | HILN |
| 10 | TTSI |
| 11 | Main Synthetic |
| 12 | Wavetable Synthesis |

The following table, TABLE 11, displays examples of possible values for the capability field "audio combination profile and level." Combination profiles are collections of object profiles.

TABLE 11

| value | meaning |
|---|---|
| 0 | Main |
| 1 | Scalable |
| 2 | Speech |
| 3 | Low rate synthesis |

The following table, TABLE 12, displays examples of possible values for the capability field "scene description profiles and levels."

TABLE 12

| value | meaning |
|---|---|
| 0 | simple |
| 1 | 2D |
| 2 | VRML |
| 3 | audio |
| 4 | complete |

Figure 2:
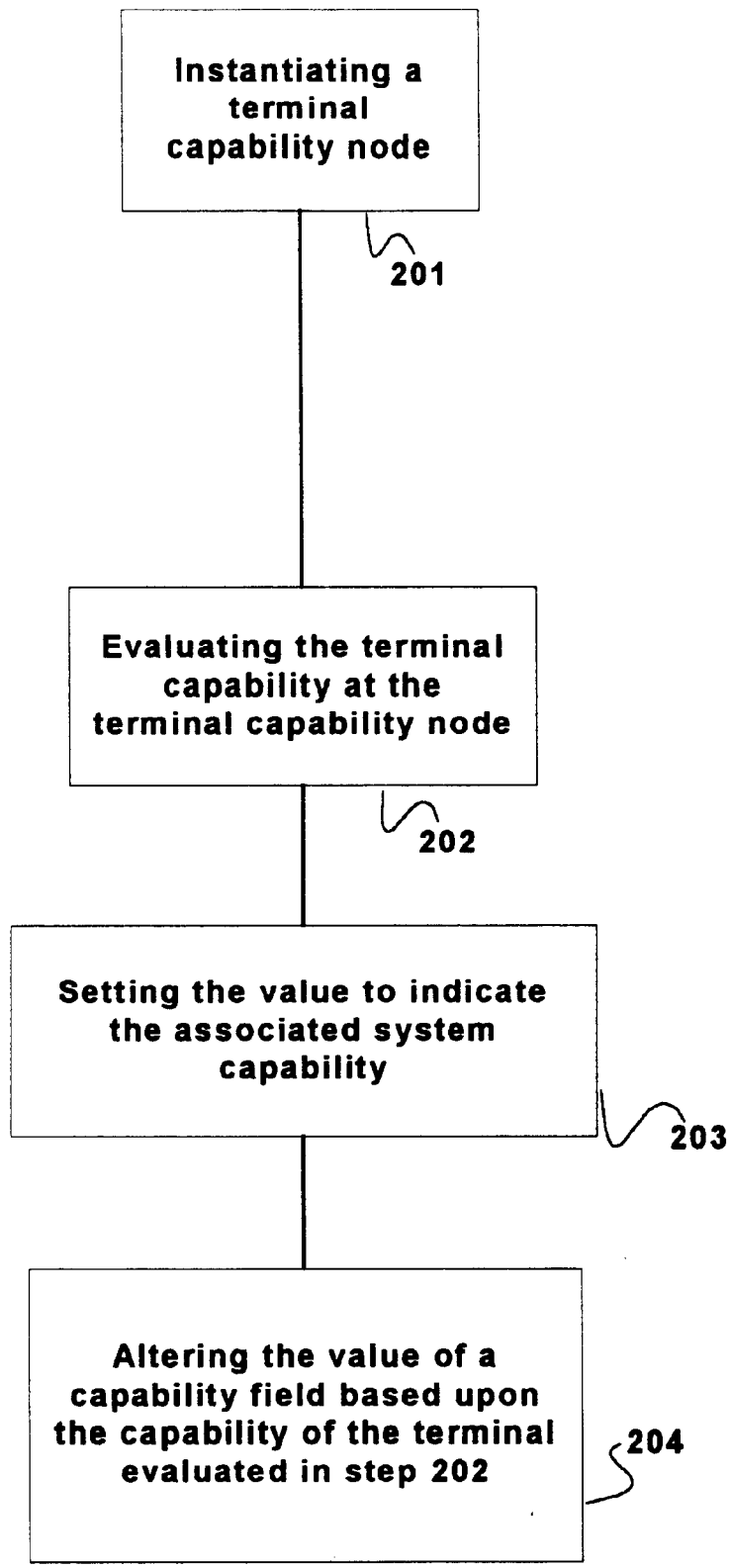
FIG. 2 is a flow chart illustrating an embodiment of a method according to the present invention.

FIG. 2 is a flow chart illustrating an embodiment of a method according to the present invention. In step 201, a termcap node is instantiated. When this node is instantiated, the terminal capability is evaluated by the system at step 202 and the value of the value field is set to indicate the associated system capability at step 203. The instantiation of the termcap node executes programs in the terminal that either know the terminal capabilities or know how to acquire the value. The same applies for the measurement of dynamic values like CPU load. To set the value field, static parameters related to hardware components are set, while dynamic parameters are measured. At step 204, the value of the capability field is altered based upon the capability of the terminal evaluated in step 202, and also based upon factors such as user preferences. The value can be altered periodically, or it can be altered based on some asynchronous trigger event. The user preferences can be set in real time, or can be input prior to displaying the multimedia data. In either circumstances, this information can be input using a standard graphical user interface.

The capability fields and their corresponding values can be any combination of the capability fields and their corresponding values described above. These fields are purely exemplary, and the various embodiments are not limited to these fields.

Figure 3:
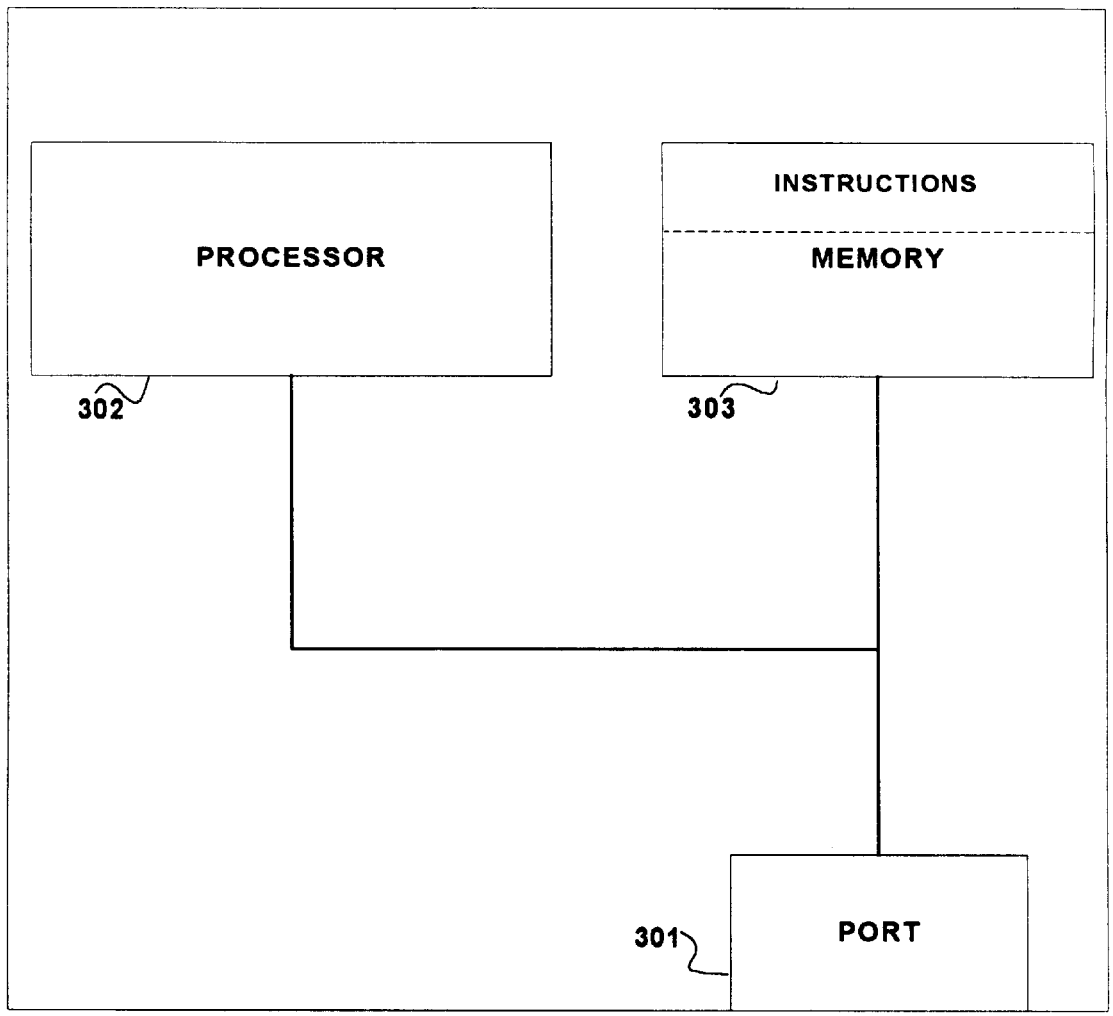
FIG. 3 is a block diagram of an apparatus according to one embodiment of the present invention.

FIG. 3 is a pictorial representation of an apparatus according to one embodiment of the present invention. Port 301 is coupled to processor 302. Memory 303 is also coupled to port 301 and processor 302, and stores instructions adapted to be run on the processor to instantiate a termcap node, evaluate the terminal capability, set the value of a capability field, and alter the value of the capability field based upon the capability and load of the evaluated terminal and user preferences. The value can be altered periodically, or it can be altered based on some asynchronous triggering event. The user preferences can be set in real time, or can be input prior to displaying the multimedia data, both methods using a standard graphical user interface. For example, a user can specify, either in real time or not, that if the frame rate drops below a certain value, then the color-depth value should be decreased to compensate for that frame rate.

For the purposes of this application, memory includes any medium capable of storing instructions adapted to be executed by a processor. Some examples of such media include, but are not limited to, floppy disks, CD ROM, magnetic tape, hard drives, and any other device that can store digital information. The instructions can be stored on the medium in a compressed and/or encrypted format, and/or in a format such that the instructions have to be compiled or installed by an installer before being executed by the processor.

In one embodiment of the present invention, the memory stores further instructions adapted to be run on the processor to store or receive predetermined user preferences used to alter the value of the capability field. In another embodiment of the present invention, the memory stores further instructions adapted to be run on the processor to receive, either periodically or asynchronously, instructions to alter the value of a capability field based upon the capability of the terminal. In another embodiment of the present invention, the memory stores further instructions adapted to be run on the processor to evaluate the load of different components of the terminal.

Figure 4:
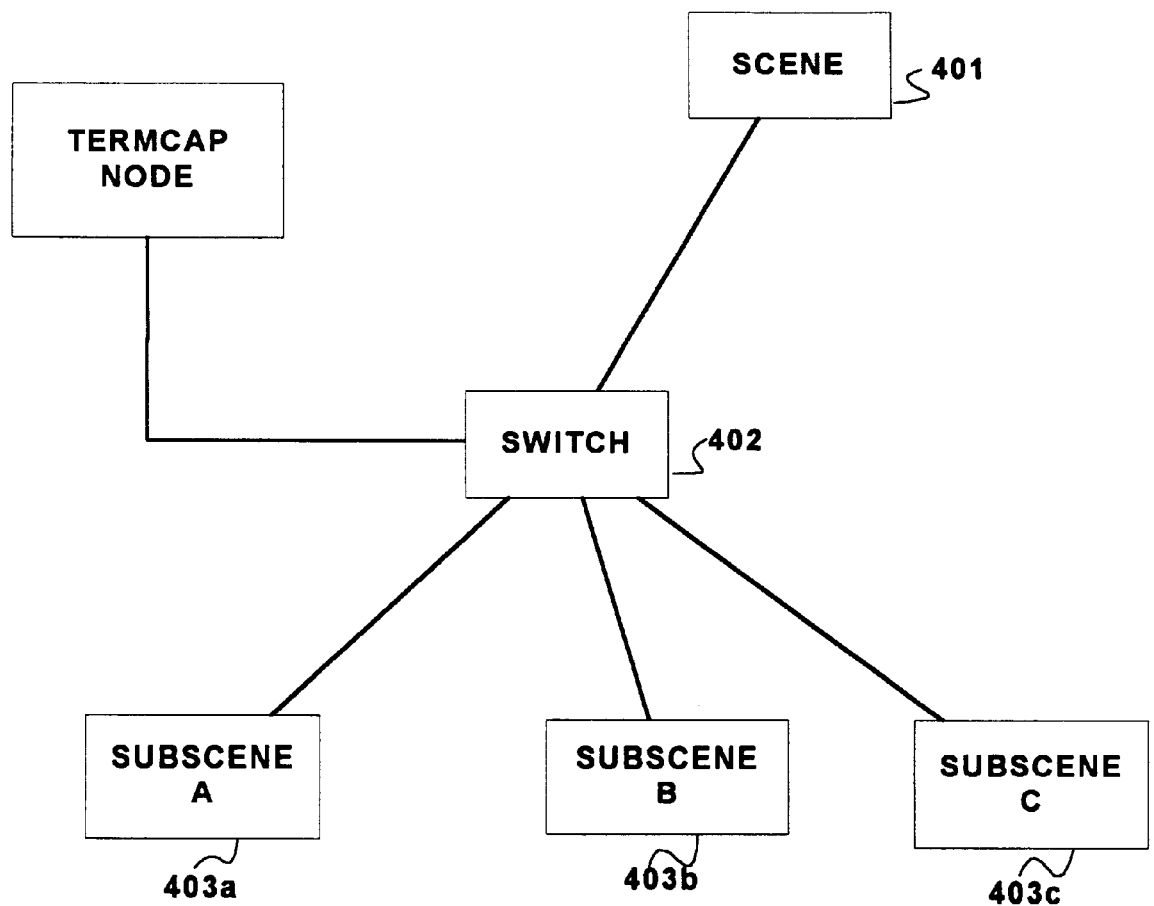
FIG. 4 is a system overview of another embodiment of the present invention.

Termcap nodes can be created at the content provider, and are transmitted to a user along with data to be displayed. FIG. 4 is a system overview of how a termcap node helps render a scene. In this figure, scene 401 contains content necessary to be rendered on a terminal. The scene contains switch 402 that allows the rendering to choose between "subscene A" 403a, "subscene B" 403b, and "subscene C" 403c. One switch is shown for clarity; more than one switch can exist for a given scene. Additionally, three subscenes are shown for clarity; more or fewer subscenes can exist attached to a given switch. Termcap node 404 is connected to switch 402. If an event occurs that triggers termcap node 404, termcap node 404 instructs switch 402 to change from one subscene to another. The triggering event can be some periodic instruction from a timer, or it can be an asynchronous event.

A termcap node, via a set of switches, allows one to define the topology of a scene on the basis of the content-provider choices and the terminal capabilities, and allows dynamic parameter adjustment of the scene nodes.

Figure 5:
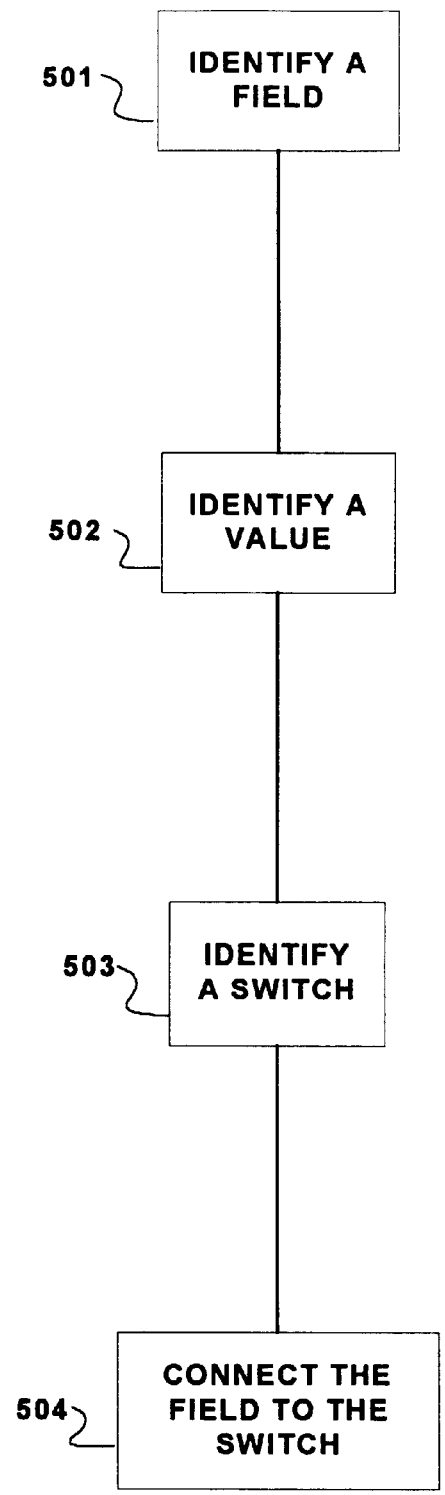
FIG. 5 is a flow chart illustrating an embodiment of a method according to the present invention.

FIG. 5 is a flow chart of an embodiment of the present invention. In this embodiment, a field of the termcap node is defined at step 501, and a value for this field is defined at step 502. At step 503 a switch is identified that is controlled by the termcap node, and at step 504, the field is connected to the switch. To connect a field to a switch, the field contains instructions that choose a switch setting based on the field's value. For example, if the value of the field is less than 10, the field instructs the switch to choose a certain subscene; if the value of the field is greater than 10, the field instructs the switch to choose a different subscene.

Figure 6:
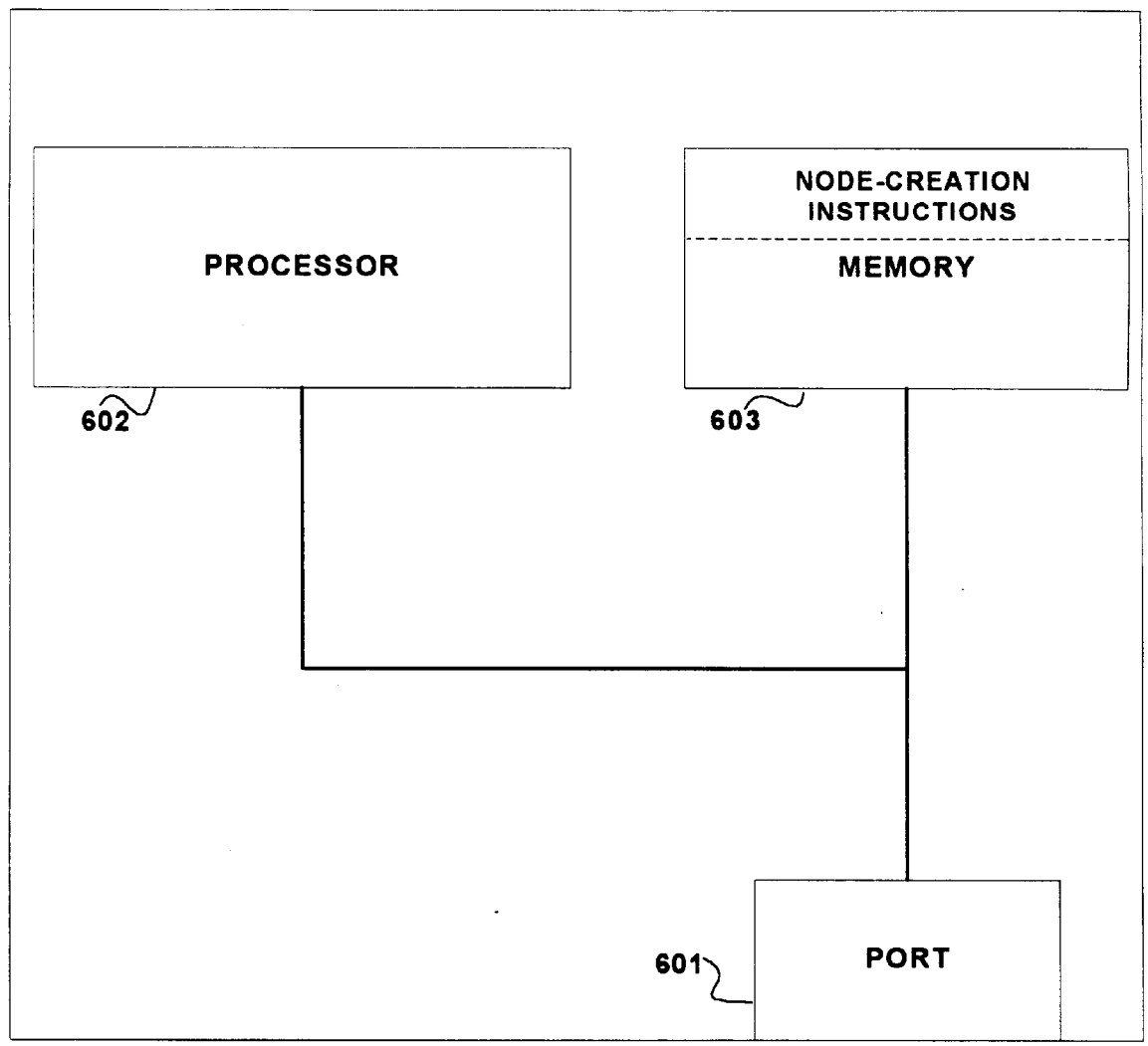
FIG. 6 is a block diagram of an apparatus according to one embodiment of the present invention.

FIG. 6 is a pictorial representation of an apparatus according to one embodiment of the present invention. In this embodiment, port 601 is coupled to processor 602. Memory 603 is also coupled to port 601 and processor 602, and stores instructions adapted to be run on processor 602 to define a field of the termcap node, give the field an initial value, identify a switch to be controlled by the termcap node, and then connect the field to the switch.

The present invention has been described in terms of several embodiments solely for the purpose if illustration. Persons skilled in the art will recognize from this description that the invention is not limited to the embodiments described, but may be practiced with modifications and alterations limited only by the spirit and scope of the appended claims.

What is claimed is:

1. A method for reproducing a multimedia data signal on a terminal, comprising:
    (a) instantiating a terminal capability node;
    (b) dynamically evaluating the terminal capability at the terminal capability node based on a set of terminal capabilities and at least one user preference;
    (c) dynamically setting the value of a capability field to indicate the associated system capability and user preference; and
    (d) altering the value of a capability field based upon the capability of the terminal evaluated in step (b).

2. The method of claim 1, wherein the capability field indicates frame rate.

3. The method of claim 1, wherein the capability field indicates color depth.

4. The method of claim 1, wherein the capability field indicates screen size.

5. The method of claim 1, wherein the capability field indicates graphics hardware.

6. The method of claim 1, wherein the capability field indicates CPU load.

7. The method of claim 1, wherein the capability field indicates memory load.

8. The method of claim 1, wherein the capability field indicates a visual object profile.

9. The method of claim 1, wherein the capability field indicates a visual combination profile and level.

10. The method of claim 1, wherein the capability field indicates an audio object profile and level.

11. The method of claim 1, wherein the capability field indicates a system scene description profile and level.

12. The method of claim 1 wherein the altered value is altered in periodically.

13. The method of claim 1, wherein the altered value is altered whenever it is needed.

14. The method of claim 1, wherein the altered value is altered to a predetermined value.

15. The method of claim 1, wherein the capability field is associated with the terminal capability node and includes a description of the hardware or software capability of the terminal, and the step of altering includes altering the value of the capability field to modify the multimedia data signal being reproduced on the terminal.

16. An apparatus for reproducing a multimedia data signal, comprising;
    (a) a processor;
    (b) a port coupled to said processor; and (c) a memory coupled to said processor and port, and storing instructions adapted to be run on said processor to
  (i) instantiate a terminal capability node;
  (ii) dynamically evaluate the terminal capability at the terminal capability node based on a set of terminal capabilities and at least one user preference;
  (iii) dynamically set the value of a capability field to indicate the associated system capability and the at least one user preference; and
  (iv) alter the value of a capability field based upon the capability of the terminal evaluated in step (ii).

17. The apparatus of claim 16, wherein the capability field indicates frame rate.

18. The apparatus of claim 16, wherein the capability field indicates color depth.

19. The apparatus of claim 16, wherein the capability field indicates screen size.

20. The apparatus of claim 16, wherein the capability field indicates graphics hardware.

21. The apparatus of claim 16, wherein the capability field indicates CPU load.

22. The apparatus of claim 16, wherein the capability field indicates memory load.

23. The apparatus of claim 16, wherein the capability field indicates a visual object profile.

24. The apparatus of claim 16, wherein the capability field indicates a visual combination profile and level.

25. The apparatus of claim 16, wherein the capability field indicates an audio object profile and level.

26. The apparatus of claim 16, wherein the capability field indicates an audio combination profile and level.

27. The apparatus of claim 16, wherein the capability field indicates a system scene description profile and level.

28. The apparatus of claim 16, wherein the memory stores further instructions adapted to be executed on said processor to receive instructions to alter the value.

29. The apparatus of claim 16, wherein the capability field is associated with the terminal capability node and includes a description of the hardware or software capability of the terminal, and the instructions including instructions to alter the value of a capability field to modify the multimedia data signal being reproduced on the terminal.

30. A computer-readable medium storing data adapted to be run on a processor to:
  (a) instantiate a terminal capability node;
  (b) dynamically evaluate the terminal capability at the terminal capability node based on a set of terminal capabilities and at least one user preference;
  (c) dynamically set the value of a capability field to indicate the associated system capability and the at least one user preference; and
  (d) alter the value of a capability field based upon the capability of the terminal evaluated in step (b).

31. The computer-readable medium of claim 30, wherein the capability field indicates frame rate.

32. The computer-readable medium of claim 30, wherein the capability field indicates color depth.

33. The computer-readable medium of claim 30, wherein the capability field indicates screen size.

34. The computer-readable medium of claim 30, wherein the capability field indicates graphics hardware.

35. The computer-readable medium of claim 30, wherein the capability field indicates CPU load.

36. The computer-readable medium of claim 30, wherein the capability field indicates memory load.

37. The computer-readable medium of claim 30, wherein the capability field indicates a visual object profile.

38. The computer-readable medium of claim 30, wherein the capability field indicates a visual combination profile and level.

39. The computer-readable medium of claim 30, wherein the capability field indicates audio object profile and level.

40. The computer-readable medium of claim 30, wherein the capability field indicates audio combination profile and level.

41. The computer-readable medium of claim 30, wherein the capability field indicates system scene description profile and level.

42. The medium of claim 30, wherein the capability field is associated with the terminal capability node and includes a description of the hardware or software capability of the terminal, and the data including data to alter the value of a capability field to modify a multimedia data signal being reproduced on the terminal.

43. A method of creating a scene graph with a termcap node, comprising:
  a. identifying a capability field;
  b. dynamically identifying a value for the capability field;
  c. dynamically identifying a switch controlled by the termcap node; and
  d. dynamically connecting the field to the switch.

44. The method of claim 43, wherein the identified capability field indicates frame rate.

45. The method of claim 43, wherein the identified capability field indicates color depth.

46. The method of claim 43, wherein the identified capability field indicates screen size.

47. The method of claim 43, wherein the identified capability field indicates graphics hardware.

48. The method of claim 43, wherein the identified capability field indicates CPU load.

49. The method of claim 43, wherein the identified capability field indicates memory load.

50. The method of claim 43, wherein the identified capability field indicates a visual object profile.

51. The method of claim 43, wherein the identified capability field indicates a visual combination profile and level.

52. The method of claim 43, wherein the identified capability field indicates an audio object profile and level.

53. The method of claim 43, wherein the identified capability field indicates an audio combination profile and level.

54. The method of claim 43, wherein the identified capability field indicates a system scene description profile and level.

55. The method of claim 43, wherein the capability field is associated with the termcap node and includes a description of the hardware or software capability of a terminal.

56. An apparatus for creating a termcap node, comprising:
  a. a port;
  b. a processor coupled to said port;
  c. a memory, coupled to said port and said processor, storing instructions to be adapted to be run on said processor, comprising:
    (i) identify a capability field;
    (ii) dynamically identify a value for the capability field;
    (iii) dynamically identify a switch controlled by the termcap node; and
    (iv) dynamically connect the field to the switch.

57. The apparatus of claim 56, wherein the capability field indicates frame rate.

58. The apparatus of claim 56, wherein the capability field indicates color depth.

59. The apparatus of claim 56, wherein the capability field indicates screen size.

60. The apparatus of claim 56, wherein the capability field indicates graphics hardware.

61. The apparatus of claim 56, wherein the capability field indicates CPU load.

62. The apparatus of claim 56, wherein the capability field indicates memory load.

63. The apparatus of claim 56, wherein the capability field indicates a visual object profile.

64. The apparatus of claim 56, wherein the capability field indicates a visual combination profile and level.

65. The apparatus of claim 56, wherein the capability field indicates an audio object profile and level.

66. The apparatus of claim 56, wherein the capability field indicates an audio combination profile and level.

67. The apparatus of claim 56, wherein the capability field indicates a system scene description profile and level.

68. The apparatus of claim 56, wherein the capability field is associated with the termcap node and includes a description of the hardware or software capability of a terminal.

* * * * *